United States Patent [19]

Kipp, Jr.

[11] 4,139,640

[45] Feb. 13, 1979

[54] METHOD OF EFFECTING THE AEROBIC THERMOPHILIC DECOMPOSITION OF ORGANIC WASTE MATERIALS

[75] Inventor: Carl E. Kipp, Jr., Dayton, Ohio

[73] Assignee: Paygro, Inc., South Charleston, Ohio

[21] Appl. No.: 871,721

[22] Filed: Jan. 23, 1978

Related U.S. Application Data

[63] Continuation of Ser. No. 378,331, Jul. 11, 1973, abandoned.

[51] Int. Cl.² ............................................. A23B 4/12
[52] U.S. Cl. ..................................... 426/55; 426/54; 426/807; 71/9; 71/10; 71/22; 71/64 JC

[58] Field of Search ................ 71/6, 7, 8, 9, 10, 12, 71/13, 14, 15, 64 SC, 64 JC, 22; 210/2–4, 9, 10, 12, 15, 63 R; 23/259.1; 426/807, 635, 636, 49, 53, 54, 55

[56] References Cited

U.S. PATENT DOCUMENTS

| | | | |
|---|---|---|---|
| 2,043,265 | 6/1936 | Roeder | 71/6 X |
| 3,438,740 | 4/1969 | Brown | 71/9 X |

Primary Examiner—Ferris H. Lander
Attorney, Agent, or Firm—J. Warren Kinney, Jr.

[57] ABSTRACT

A composting method which produces complete aerobic digestion and pasteurization of animal and other solid organic waste materials is effected in an open top, elongate, composting vessel, for producing an odor free, pasteurized, organic fertilizer, mulch or animal feed supplement.

14 Claims, 6 Drawing Figures

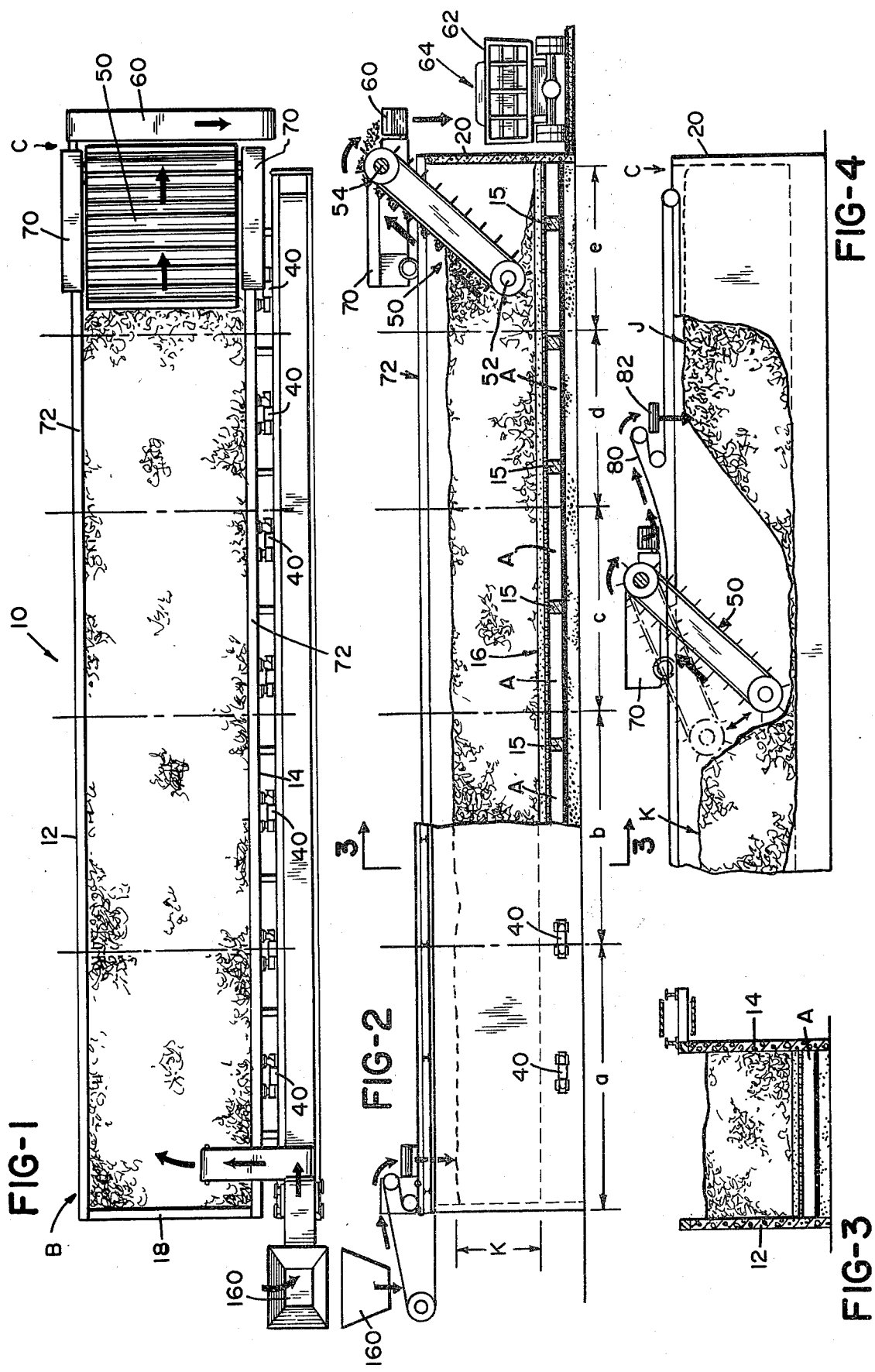

METHOD OF EFFECTING THE AEROBIC THERMOPHILIC DECOMPOSITION OF ORGANIC WASTE MATERIALS

This is a continuation, of application Ser. No. 378,331, filed July 11, 1973, and now abandoned.

BACKGROUND OF THE INVENTION

1. Field of the Invention

The present invention is directed to the use of thermophilic (heat loving) bacteria for effecting the efficient aerobic decomposition of animal and other solid organic wastes to produce a pasteurized, organic fertilizer, mulch, and/or an animal feed ingredient.

Broadly speaking, the use of thermophilic bacteria for effecting the aerobic decomposition of organic wastes is not new.

The present invention is directed to an improved, highly efficient method of processing organic waste, and in particular animal manure, by providing an ideal environment for enhancing the growth of thermophilic bacteria in the waste product being subjected to aerobic decomposition.

The process of the present invention does not run afoul of the ecological standards. The by-products produced during the aerobic decomposition are carbon dioxide and water, and the final product is free of odor. Practice of the process does not produce an air or water pollution problem.

2. Description of the Prior Art

In an article in the Oct, 1972 issue of Feedlot Management magazine, entitled "Manure Is Food For Protein" at pages 18–20, a process developed by General Electric Company is described wherein raw cattle manure is converted into a pasteurized protein powder animal feed supplement. In the General Electric process cattle manure is fed to a particular strain of thermophilic bacteria, the bacteria being mixed with the manure and water in a series of fermentation tanks, the contents of which are maintained at 130°–140° F.

U.S. Pat. No. 2,954,285 discloses the use of an elongate, rotatable drum having three zones in which waste materials containing organic constituents are subjected to aerobic thermophilic fermentation. The organic constituents are continuously advanced in the drum through a preheating zone, a main fermentation zone and a drying zone. Air is introduced into the fermenting mass, and in some instances, water is also added to the material. The reference teaches that pasteurization occurs when the temperature of the mass rises to 60°–70° C.

U.S. Pat. No. 3,438,470 discloses a composting conveyor, and in Col. 3, lines 30–43, it is stated that digestion of organic material occurs in two phases, "a first phase of mesophilic digestion in the range of about 110° for a 24 hour period, then thermophilic digestion at about 140° F. for a further 24 hour period followed by a sterilization period of approximately 165° F. for a 48 hour period." The digesting process "is helped by the introduction of air at the bottom of the tank" and by the addition of water to the material being processed.

U.S. Pat. No. 3,285,732 discloses the method of effecting the aerobic decomposition of organic material by continuously maintaining the contents of a composting vessel in the thermophilic temperature range and of intermixing undecomposed organic material at ambient temperature with the decomposing mass so that the newly added undecomposed material is thoroughly intermixed with the decomposing mass. Air is supplied to the contents of the vessel at a rate such that the "exhaust gas" from the decomposing mass contains residual oxygen.

U.S. Pat. No. 2,474,833 discloses a method for making organic fertilizer from organic waste by the propogation of aerobic bacteria while continuously forcing air through a mass of decomposing organic material housed within a vertical tank. The contents of the tank are agitated and the spent air is continuously withdrawn from the mass at vertically spaced intervals of the tank.

U.S. Pat. Nos. 3,010,801 and 3,138,448 disclose, respectively, apparatus and a method for aerobic decomposition of organic wastes wherein controlled quantities of oxygen are injected into a decomposing mass and wherein the exhaust gas from the decomposing mass is utilized to determine the amount of oxygen-containing-gas required to effectively facilitate the thermophilic decomposition of the organic waste products.

U.S. Pat. No. 2,947,619 discloses a process for manufacturing compost composed of fermented organic waste material while in a windrow, the particles of which are sprayed with water for facilitating the aerobic fermentation of the contents of the pile until such time as the moisture content is reduced to about 35% after which the product is turned or worked and tossed into the air whereby to fall, by gravity, to form another porous windrow pile, said technique being repeated until such time as the aerobic fermentation is substantially complete.

U.S. Pat. No. 3,114,622 discloses a method of utilizing thermophilic bacteria for effecting decomposition of organic waste material in solid flowable form by providing the organic material in two horizontal beds of substantially constant depth, wherein fresh undecomposed material is added in small increments throughout the entirety of one bed and of removing sufficient digested material to maintain the bed depth constant.

U.S. Pat. No. 2,285,834 discloses a process for the treatment of organic matter by fermentation utilizing thermophilic bacteria until such time as the entire mass has been converted into a substantially dry, humus fertilizer having the appearance of leaf mold.

U.S. Pat. No. 2,878,112 discloses a method for composting manure by providing controlled conditions of air, moisture and temperature which are conducive to the growth of bacteria wherein the organic material to be composed is maintained in a vertical column from the bottom of which column some of the manure is withdrawn and returned to the top of the column whereby each manure particle in the column will eventually migrate from the top to the bottom of the column. The contents of the column are continuously aerated and exposed to a controlled current of moist, warm air.

U.S. Pat. No. 3,294,491 discloses an apparatus to be used in composting organic waste products and on page 3, lines 46–52, it is stated that "during the mesophilic phase of digestion the temperature of air discharged from the pots 46 may be regulated to maintain 110° F. temperature within the mass of organic material 44. Likewise, the thermophilic and sterilizing phases may be regulated as to the respective temperature of 140° and 165°."

Each of U.S. Pat. Nos. 3,438,740; 3,294,491; 3,323,896; 3,385,687 and 3,451,791 either disclose or refer to the process of subjecting organic material to a mesophilic phase of digestion at 110° F. temperature after which it is subjected to thermophilic temperature of 140° F. and thereafter to sterilizing temperatures of 165° F.

SUMMARY OF THE INVENTION

Animal and other solid organic wastes are rapidly composted and pasteurized by means of the aerobic decomposition of the wastes by thermophilic bacteria whereby to produce an organic fertilizer and mulch and/or an animal feed ingredient. The mass of organic waste material undergoing decomposition is maintained at predetermined levels within an elongate composting vessel whereby to ensure a maximum mass of material in the vessel at all phases of the decomposing process. No particular strain of thermophilic bacteria is utilized, the subject process being highly effective by providing a kindly environment for the thermophilic bacteria naturally present in the undecomposed organic waste products until such time as the mass shall have attained thermophilic temperatures, after which the entire contents of the vessel are progressively mixed and concurrently advanced in the vessel toward the discharge end thereof. Quantities of air are introduced intermittently, either upwardly or downwardly through the contents of the vessel at rates sufficient to augment the growth and action of the thermophilic bacteria normally present in the organic waste material being processed.

The temperatures attained within the decomposing material reaches and often exceeds 180° F., said temperature augments and substantially shortens the period of time required to reduce animal and other solid and organic waste into fertilizer and mulch and/or an animal feed ingredient. The final product as removed from the composting vessel is pasteurized whereby substantially all objectional bacteria and any virile seeds initially in the undecomposed organic waste are sterilized and rendered innocuous.

BRIEF DESCRIPTION OF THE DRAWINGS

FIG. 1 is a top elevation of a composting vessel, such as may be used in practicing the subject invention.

FIG. 2 is a side elevation of the device of FIG. 1, partially in section for clarity of detail and ease of understanding, illustrating the manner in which the fully processed contents of the vessel are unloaded or removed from the discharge end thereof.

FIG. 3 is a sectional view taken on line 3—3 of FIG. 2.

FIG. 4 is a partial side elevational view, somewhat similar to FIG. 2, illustrating the manner in which the contents of the vessel are agitated, intermixed and advanced within the vessel.

BRIEF DESCRIPTION OF THE PREFERRED EMBODIMENT

With particular reference to FIGS. 1-4, the numeral 10 denotes, generally, an open top vessel having spaced apart, parallel side walls 12 and 14, a bottom wall 16 and spaced apart, parallel end walls 18 and 20.

Figure 5:
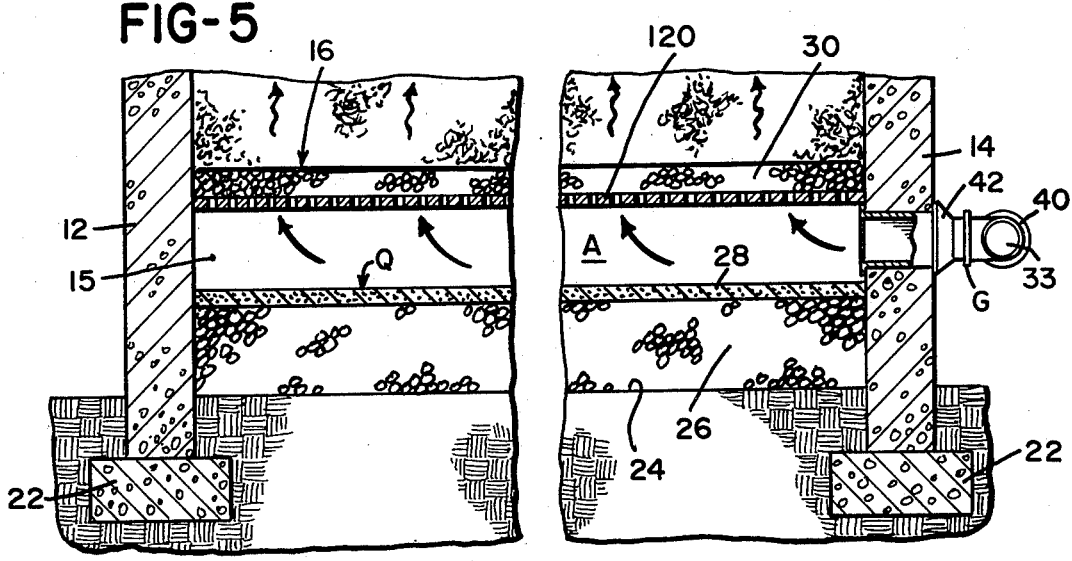
FIG. 5 is an enlarged sectional view of a detail of the lower portion of the vessel of FIG. 1 illustrating the manner in which air may be delivered upwardly to or drawn downwardly through the material housed within the vessel.

As best illustrated in FIG. 5, the side and end walls may rest on suitable footings 22. The numeral 24 denotes a compacted surface which supports a bed of compacted gravel, or the like, 26, which comprises the base and support for a layer 28 of blacktop, concrete, or the like, the upper surface Q of which constitutes the lower surface of an air space or chamber A.

The lower wall or bottom 16 of the vessel is defined by a perforate pan or member 120 which spans the area defined by the side and end walls and which is spaced above and in substantial parallelism with the upper surface Q by a dimension approximately 8–12 inches for establishing the upper surface of the open space or area A immediately beneath bottom wall 16.

In the preferred embodiment of the invention, a plurality of individual air chambers A are provided throughout the length of vessel 10, wherein the width of each air chamber extends between side walls 12 and 14 and wherein the length of each air chamber is defined by transverse members 15 (see FIGS. 2 and 5) which extend between side walls 12 and 14.

Figure 6:
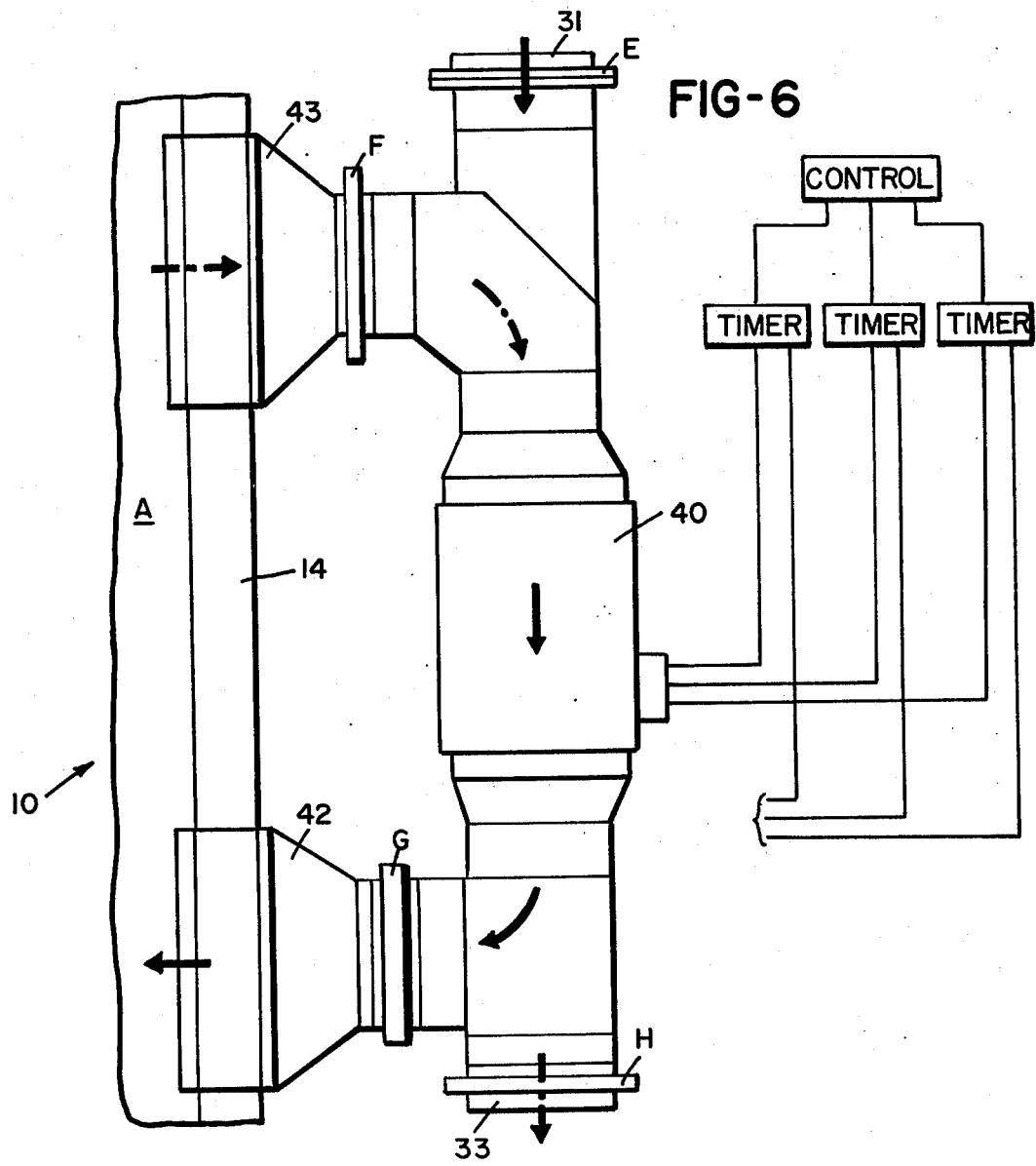
FIG. 6 is a schematic view of one of a plurality of air fans and their associated duct work which are disposed along the length of the vessel illustrating the manner in which the air may be introduced into the bottom of the vessel or drawn downwardly through the contents of the vessel by controlling the setting of various dampers.

A plurality of fans 40, one for each air compartment A, are disposed in spaced relationship along a side of the vessel for individually and selectively supplying air, under pressure, into their respective compartments by means of conduits 42, FIG. 6, wherein the letters E, F, G and H denote, diagrammatically, gates which may be conveniently manipulated between open and closed positions for enabling fan 40 to selectively introduce air from intake 31 into an air compartment A beneath bottom 16 or to withdraw air from said compartment. When gates E and G are opened and each of gates F and H are closed, operation of fan 40 will cause air, under pressure, to be introduced into air compartment A through duct 42; however, when gates E and G are closed and gates F and H are opened, operation of fan 40 will cause air to be sucked or drawn through bottom 16, compartment A, through conduit 43, fan 40 and thence through outlet 33.

Uniformly satisfactory results have been obtained in those instances in which a 3 inch layer of washed gravel 30 is supported on the upper surface of the perforate member 120. Bottom wall 16 of the vessel constitutes the layer 30 of gravel and perforate member 120. The gravel bed effectively prevents the material being processed from contacting the perforate member.

In practicing the method of the subject invention, individual charges of undecomposed organic material such as, by way of example, raw animal manure, both solid and liquid, and bedding, such as, by way of example, straw, corn stalks, and the like, is introduced into end B of the elongate composting vessel 10.

In those instances in which the width of the vessel 10 is 20 feet, the length 400 feet and the depth 12 feet, a charge of undecomposed organic material is introduced into the vessel to a depth of from 8 to 12 feet extending from end wall 18 toward end wall 20 for a distance of from 125 to 200 feet. This charge and all of the previously added material in the vessel is maintained in a quiescent condition as and until the mass of the most recently added charge of material attains thermophilic temperatures in the range of 140° F.

After the last added charge has attained thermophilic temperatures, the entire contents of the vessel are agitated, intermixed, and advanced toward the other end, C, of the vessel for providing an empty space or area at end B of the vessel to receive a second or subsequent charge of undecomposed organic material. The contents of the vessel are agitated, intermixed, and advanced toward the other end of the vessel by means of an endless conveyor indicated generally by the numeral 50, the lower end 52 of which is pivoted relative to its upper end as at 54 by any suitable means not relevant to the subject invention. The initial operation of conveyor 50 will, as illustrated in FIG. 2, elevate the contents of the vessel upwardly over end wall 20 for discharging same onto another conveyor 60 which will discharge the material into a suitable receptacle 62 of a truck or the like 64, whereby the first, or endmost batch of material adjacent end C of the vessel will be removed therefrom.

The conveyor 50 is suitably mounted relative to a pair of wheeled trolleys 70 which are located on opposite sides of the vessel for movement along tracks 72.

The batch or charge of material immediately adjacent the endmost batch removed from the vessel and deposited in receptacle 62 is agitated, intermixed and advanced, as illustrated in FIG. 4, by means of an endless conveyor belt 80 which is operably associated with a transverse conveyor 82 in such a manner as to advance the next succeeding batch of material within the vessel to the area originally occupied by the preceeding batch of material toward end C of the vessel, and wherein the height of the material so advanced is, in each instance, re-established at a 8–12 foot height, for thereby maintaining a maximum mass of organic material in the vessel in the process of being subjected to the action of thermophilic bacteria. After the various previous batches of decomposing and/or decomposed material within the vessel have been sequentially advanced toward end C and after the batch which most recently attained thermophilic temperatures has been advanced toward end C for providing a space adjacent end B for receiving the next charge of undecomposed organic material, a fresh charge of undecomposed organic material is introduced into end B of the vessel, after which the entire contents of the vessel are maintained in a quiescent state until such time as the most recently added charge has attained thermophilic temperatures, after which the first or endmost charge or batch adjacent end C is removed and thereafter all succeeding batches are sequentially advanced to the areas originally occupied by the preceding batches.

During the aforesaid process, air is introduced through the various batches of material within the vessel at rates sufficient to augment promote and/or maintain growth of thermophilic aerobic bacteria in the organic material undergoing decomposition.

The total volume of air which is caused to pass through the several charges or batches of material varies with the degree of thermophilic decomposition which has occurred in the material. That is, a lesser total volume of air is introduced into an initially deposited charge of undecomposed organic material than is introduced into batches of material which have already attained thermophilic temperatures.

It has been noted that when the material of the individual charges in advance of the last added charge have been subjected to temperatures of 160° F. and greater, for a period of 72 hours, pasteurization of the material has occurred which means decomposition has progressed to such an extent that the material is odorless and substantially free of all injurious bacteria.

As the thermophilic decomposition process within the vessel progresses, the volume of each individual charge or batch of material becomes less than its initial volume, as evidenced by the fact that the height of each batch of material decreases appreciably during those periods of time while the contents of the vessel are in a quiescent state. In FIG. 4, the letter J denotes the height to which the material is stacked within the vessel after each filling and/or agitation step, whereas the letter K indicates the height to which the material settles during its period of quiescence by reason of the thermophilic decomposition which is continuously occurring in the material. In FIG. 2, the letter K denotes, as in FIG. 4, the level of the material within the vessel after it has settled from its initial height since the conditions illustrated in FIG. 2 are those which prevail when the contents of the vessel are in the process of being turned over and advanced toward the discharge end of the vessel.

It should be understood that the contents of vessel 10 are always moved from end B toward end C thereof and that such movement always starts at the discharge or end C and moves toward end B.

In those instances in which a conveyor mechanism, such as illustrated in FIGS. 2 and 4, is used, the lower end 52 of conveyor 50 will be elevated to a position above the upper surface of the vessel walls in order that the conveyor may be moved to end C of another vessel or returned to end C of the same vessel whereby to unload the material comprising the endmost batch of a vessel after the last added charge of organic material has attained thermophilic temperatures.

Animal manures and solid organic waste material including bedding, comprising straw, corn cobs, sawdust, bark, and the like, having a moisture content of from 40% to 70%, may be initially introduced into a suitable chopper denoted, generally, by the numeral 160, and thence loaded or deposited into the vessel adjacent end B thereof to a depth of from 8 to 12 feet. Air is intermittently introduced into the individual chambers A beneath bottom wall 16 of the vessel whereby the air is forced upwardly into and through the organic material by the high volume fans 40 which produce from 3 inches to 9 inches static head pressure depending on the density and porosity of the organic material within the vessel.

Fans 40 are operated on an intermittent basis determined by the oxygen content of the gases in the organic material in the vessel. When the oxygen content of the gases in the material drops to the range of 2%–10% the fans are operated to replace the oxygen deficient gas by forcing fresh air having an oxygen percentage of approximately 20% through the material within the vessel. The percentage of oxygen in the gases in the material in the vessel determines the frequency and duration of operation of the fans wherein the oxygen content of the gases within the material of the vessel are influenced by the relative humidity of the air being introduced into the vessel.

The volume of air intermittently forced through the material in the vessel can be regulated by changing the speed of the fans. The operating cycle of the fans is determined by the temperature of the air being introduced to the vessel. Temperatures below 60° F. require a reduction in the running time of the fans to preclude mechanical cooling of the temperature of the material within the vessel.

Air is intermittently rather than continuously introduced to the contents of the vessel during the aerobic decomposition of the contents. The operating cycle of the fans 40 are controlled by suitable timer circuits which enable the fans of each of the individual air compartments to be selectively and independently controlled.

After the material has been pasteurized, as above noted, it may be utilized as an odorless manure or mulch product and/or utilized as a feed supplement.

The action of the thermophilic bacteria on the organic material within the vessel will result in the most recently introduced charge of material attaining thermophilic temperatures in the neighborhood of 140° F., at which temperatures the bacteria actively start to break down the organic material with the release of carbon dioxide and water. After the most recently added charge of undecomposed organic material has been introduced into the vessel all of the other charges, viz, the entire contents of the vessel are permitted to remain in a quiescent state until such time as the most recently added charge of material attains thermophilic temperatures, after which the entire contents of the vessel are subjected to mixing and advancement toward discharge end C of the vessel, as hereinabove more fully set forth.

By introducing proper amounts of air to the mass of material within the vessel the action of the thermophilic bacteria is augmented to such an extent that temperatures ranging from 160° F. to 184° F. are attained and maintained in those portions of the vessel beyond the most recently added charge.

As an alternate process, and in order to materially speed up the digestive process, the material intially introduced into end B of the vessel may be preliminarily processed whereby to induce and establish thermophilic temperatures within the material at the time it is initially introduced into the vessel. Such preliminary processing may be effected outside of the vessel by means of the well-known windrowing process, wherein the undecomposed organic material is initially deposited in long triangular shaped piles which are conducive to the thermophilic-bacteria induced decomposition of the material. In those instances in which such preliminary processing material is added to the vessel, it is not necessary that the contents of the vessel be maintained in a quiescent state until such time as the most recently added material attains thermophilic temperatures, since the material, as introduced into the vessel has already attained, or has practically attained, thermophilic temperatures. The temperature of the material within the vessel will, in short order, attain temperatures in the range of from 160° F. to 184° F. By permitting the material to remain in the vessel at temperatures of 160° F. or greater, for a period of 72 hours, the material will have been effectively pasteurized thereby rendering it ideally suited for use as an odorless organic fertilizer or mulch and/or an animal feed ingredient.

When the material initially introduced into the vessel has been preliminarily processed, as aforesaid, the contents of the vessel are turned, at least once, so that all portions of the mass will be subjected to the thermophilic bacteria induced temperatures. The material as removed from end C of the vessel may be immediately processed, that is, put up in bags or ground as feed supplement, or it may be stored in large piles until ready for use.

In those instances in which the organic waste material initially introduced into end B of the vessel is at ambient temperature, and wherein the contents of the vessel are turned over and advanced five times as it is moved from end B to end C of the vessel, the length "a" of the first charge within vessel 10 may, as illustrated in FIG. 2, take up the first 140 feet of the vessel, whereas the oldest batch of material in the vessel, immediately adjacent end wall 20, will have a length "e" of but 40 feet. The mass of material immediately preceding the initial charge would have a length "b" of approximately 100 feet, and the length "c" and "d" of the next two succeeding batches of material would approximate 70 feet and 50 feet, respectively. As earlier indicated, it is important that the height of the material as initially introduced into the vessel and the height of the material as advanced, turned and redeposited in the vessel be maintained at a substantially uniform depth of from 8 to 12 feet in order to ensure optimum operating conditions for the process.

With further reference to FIG. 2, it will be noted that the contents of the vessel is agitated, intermixed, turned and advanced in the order in which the individual charges were introduced into the vessel, that is, the material comprising the oldest charge at zone "e" will be removed from the vessel as it is advanced. Thereafter, the material in zone "d" will be agitated, intermixed, turned and deposited in zone "e" to depth J (FIG. 4) which is the depth of the material which will be added, as a "new" charge to zone "a" after the material in each of zones "e", "d", "c", "b", and "a" have been advanced toward discharge end 20 of the vessel. It should be understood that the level of the material illustrated in FIG. 2 indicates the level to which the contents of the vessel has settled during that period of time while the contents of the vessel are maintained in a quiescent state as the new, or most recently added charge of material of zone "a" attains thermophilic temperatures as a result of the action of the thermophilic bacteria in the material.

In other words, as the conveyor mechanism 50 of FIG. 2 is advanced to the left, toward the loading or forward end 18 of the vessel the material in each preceding zone will be transferred to the next succeeding zone at a height of from 8–12 feet, and wherein the action of the conveyor will provide an empty space in zone "a" into which a fresh or new charge of organic waste material will be deposited to a depth of from 8–12 feet. Stated differently, the contents of each of the zones in effect, maintains its identity as the material of each zone is advanced step-by-step, as it were, toward the discharge end of the vessel.

As earlier noted, in practicing the present invention air is intermittently introduced throughout the mass of material within the vessel. Uniformly satisfactory results have been obtained in those instances in which the last, or most recently added charge of organic waste material to zone "a" of the vessel, is subjected to ambient air which is introduced into those of air chambers A which underlie said zone for a period of ten minutes out of thirty minutes, at a static pressure of 9 inches. The overall cooling effect of the air thus intermittently introduced into the material is minimal and does not slow down or adversely effect the action of the bacteria. The air so introduced effectively increases the oxygen content of the organic waste material whereby to induce and augment vigorous growth of the thermophilic bacteria therein. The bacteria use up most of the available oxygen in the material during the next 20 minutes at which time a fresh supply of ambient air is introduced for a period of 10 minutes for replenishing the oxygen content of the material.

This process is repeated until the mass of material of zone "a" attains thermophilic temperatures of about 140° F., at which time the entire contents of the vessel are agitated, intermixed, turned and advanced.

Those portions of the material in the vessel which have already attained thermophilic temperatures, such as, by way of example, in zones "b"–"e" are subjected to air from the various air chambers A which underlie said zones for periods of time from 16–18 minutes out of 30 minutes, whereby to supply or replenish the oxygen content of the decomposing material as used up by the thermophilic bacteria in said zones. By thus intermittently introducing air throughout the mass of material in the vessel it is not uncommon to produce temperatures in the material in zones "b"–"e" in excess of 165° F., to wit, up to 184° F. Temperatures in excess of 165° F. materially augment and shorten the overall time required to effect complete aerobic decomposition and pasteurization of the organic waste material originally introduced into vessel 10.

By thus intermittently introducing air into the mass of material, the cooling effect of the air on the material is minimized and the growth and efficiency of the thermophilic bacteria are greatly enhanced resulting in production of higher temperatures in the material undergoing aerobic digestion.

In those instances in which it is desirable to dry, that is, reduce the moisture content of the completely decomposed and pasteurized material within the vessel, such as, by way of example, in zones "d" and "e", ambient temperature air may be continuously introduced into the material via those of chambers A beneath said zones for drying and cooling the contents of the material of said zones.

It should be noted and understood that from the time a new charge of organic waste material has been introduced into the vessel until the material has been subjected to thermophilic bacteria-induced temperatures of at least 160° F. for 72 hours, the quantity, time duration or rate at which air is supplied to material in the vessel will vary with the degree or stage of decomposition of the material, it being noted that the more advanced the degree of decomposition, the greater the amount of air will be intermittently supplied.

The moisture content of the fully decomposed and pasteurized material as it leaves zone "e" is in the range of 25% to 40% in those instances in which the material has been subjected to the intermittent introduction of air throughout the entire length of the vessel. The moisture content may be reduced to 15%–25% by continuously adding air to the fully decomposed and pasteurized material. The continuous addition of air will also reduce the temperature of the material from temperatures in the range of 165° F.–184° F. at which temperature the action and activity of the thermophilic bacteria will be substantially impaired.

It should be understood that the aforesaid description of the periods during which air is intermittently supplied to various portions of the contents of the vessel are exemplary, rather than restrictive.

What is claimed is:

1. A process for the aerobic decomposition of animal and other solid organic waste material solely by the action of the host thermophilic bacteria inherently in said material which comprises the steps of:

(a) sequentially introducing individual charges of undecomposed organic waste material to a substantial and predetermined depth into the full width of an empty open space at one end of an elongate open-topped composting vessel having upstanding side and end walls and a substantially flat, coplanar perforate bottom, said material introduced into the vessel substantially free of overlying relationship or intermixing with the last previously added charge of material already present in the vessel immediately in advance of said open space;

(b) maintaining all charges of the material in the vessel in a quiescent state as and until the last added charge of material has attained thermophilic temperatures;

(c) then simultaneously agitating, intermixing and turning, while sequentially advancing in a step-by-step manner the individual charges of material in the vessel toward the other end thereof in the same order in which the individual charges of material were introduced therein, wherein the depth of each charge of advanced material is restored to substantially the original predetermined depth and width to which said individual charge was initially deposited in the empty space at said one end of the vessel, said step-by-step advance accomplished by first removing the oldest, fully decomposed, pasteurized charge of material from the said other end of the vessel thereby providing an empty space in said vessel adjacent said other end into which the next oldest charge of material is then advanced, and after which each of the next progressively older charges of material are sequentially advanced one-by-one toward the said other end of the vessel for in each instance providing a corresponding empty space into which the next subsequently added charge of material is deposited with the foremost end of each but the oldest subsequent charge contacting the rearmost end of the preceding charge and wherein each said subsequently advanced charge of material is substantially free of overlying relationship or intermixing with the next adjacent previously added charge;

(d) intermittently supplying, selectively and independently, air under pressure via said perforate bottom to and throughout each individual charge of material in the vessel whenever the oxygen content of any individual charge falls below a predetermined value, at such rates as to augment and promote the growth of the thermophilic bacteria in each particular charge of the material in the vessel.

2. A process as called for in claim 1 wherein each last individual charge of undecomposed organic waste material deposited in the vessel is deposited in and completely fills the said empty open space at the said one end of the vessel to an overall depth of from 8 to 12 feet for providing a critical mass of material which is conducive to the attainment of thermophilic temperatures in said last added charge within a period of time of from 14 to 36 hours.

3. A process as called for in claim 1 wherein the last added charge of material while maintained in a quiescent state attains thermophilic temperatures in the range of 140° F., while the temperatures of the other charges of material in the vessel attain temperatures of at least 160° F. for the duration of the process.

4. A process as called for in claim 1 wherein the air is selectively introduced into an individual charge of material whenever the oxygen content of that particular charge is in the range of from 2%–10%, the air being supplied to said charge until the oxygen content thereof is restored to approximately 20%.

5. A process as called for in claim 4 wherein the air is introduced into the various charges at a static pressure of about 9 inches of water.

6. A process as called for in claim 1 wherein each but the last added individual charge of material is retained in the vessel until it has attained a temperature of at least 160° F. for a minimum period of 72 hours to ensure complete decomposition and pasteurization thereof.

7. A process as called for in claim 1 wherein the temperature of the individual charges of material, other than the last added charge of material, attain temperatures of from 160° F. to more than 180° F.

8. A process as called for in claim 1, wherein the organic waste material introduced into the vessel comprises substantially undecomposed animal waste and bedding having a moisture content of from 40% to 70%.

9. A process as called for in claim 1, wherein the fully decomposed, pasteurized material as removed from the vessel has a moisture content of from 15% to 40%.

10. A process as called for in claim 1, wherein the material introduced into the vessel is agitated, intermixed, turned and advanced at least twice during the composting process, and wherein the material before being discharged from the said other end of the vessel is maintained at thermophilic temperatures of at least 160° F. for 72 hours.

11. A process as called for in claim 1, wherein the organic waste material initially introduced into the composting vessel is at substantially ambient temperature.

12. A method as called for in claim 1, wherein the air intermittently introduced into the material of the vessel is at ambient temperature.

13. A method as called for in claim 1, wherein the material initially introduced into the vessel has substantially attained thermophilic temperatures.

14. A process as called for in claim 1, wherein a continuous supply of air is introduced via the perforate bottom of the vessel to those portions of the contents of the vessel which have attained temperatures of 160° F. or more for 72 hours for cooling said material in the vessel while simultaneously reducing the moisture content thereof to values of from 15% to 40%.

* * * * *